United States Patent
Angleitner

(10) Patent No.: US 8,668,429 B2
(45) Date of Patent: Mar. 11, 2014

(54) DEPALLETING UNLOADING CONVEYOR

(75) Inventor: Karl Angleitner, Wels (AT)

(73) Assignee: TGW Mechanics GmbH, Wels (AT)

( * ) Notice: Subject to any disclaimer, the term of this patent is extended or adjusted under 35 U.S.C. 154(b) by 1061 days.

(21) Appl. No.: 12/452,722

(22) PCT Filed: Jul. 10, 2008

(86) PCT No.: PCT/AT2008/000252
§ 371 (c)(1),
(2), (4) Date: Jan. 28, 2010

(87) PCT Pub. No.: WO2009/012508
PCT Pub. Date: Jan. 29, 2009

(65) Prior Publication Data
US 2010/0162694 A1    Jul. 1, 2010

(30) Foreign Application Priority Data
Jul. 20, 2007   (AT) .................. A 1155/2007

(51) Int. Cl.
*B65G 59/02*      (2006.01)

(52) U.S. Cl.
USPC ............... 414/796.6; 414/797.3; 414/795.9; 700/250

(58) Field of Classification Search
USPC ............ 198/518; 271/18, 268, 4.08, 81; 414/529, 574, 793.5, 796.5, 796.7, 414/797.2, 933
See application file for complete search history.

(56) References Cited

U.S. PATENT DOCUMENTS

| | | | | |
|---|---|---|---|---|
| 3,749,257 A | * | 7/1973 | Yamashita | 414/796.7 |
| 3,789,286 A | * | 1/1974 | Towne et al. | 318/696 |
| 4,119,219 A | * | 10/1978 | Marschke | 414/796 |
| 4,278,395 A | * | 7/1981 | Thunell | 414/814 |
| 4,453,874 A | * | 6/1984 | Veldhuizen et al. | 414/797.3 |
| 4,478,402 A | * | 10/1984 | Kane | 271/100 |
| 5,222,857 A | * | 6/1993 | Hasegawa | 414/788.4 |
| 5,238,350 A | * | 8/1993 | Krieg et al. | 414/278 |

(Continued)

FOREIGN PATENT DOCUMENTS

| | | |
|---|---|---|
| DE | 1 907 109 | 9/1970 |
| DE | 2 137 827 | 5/1972 |
| DE | 26 31 942 | 2/1977 |
| DE | 38 12 756 | 6/1989 |

(Continued)

OTHER PUBLICATIONS

International Search Report.

*Primary Examiner* — Gregory Adams
(74) *Attorney, Agent, or Firm* — Collard & Roe, P.C.

(57) ABSTRACT

The invention describes a depalleting device (1) and a method for operating the latter for a transported product (2) provided in a stack comprising a mounting table (8) which is adjustable linearly in a guiding arrangement (10) by a feed drive (9), and comprising a conveying device (4) arranged on the latter and drive-connected to a drive motor and with a mounting conveying device (23) arranged at least at one end section (20) of the conveying device (4). The mounting conveying device (23) is drive-connected to a drive motor that is independent of the drive of the conveying device (4). By means of a detecting means (52) of the mounting conveying device (23) a load parameter is detected which acts on the latter on placing a conveying roller up to the transported product (2) and a signal is generated in a control and regulating device for controlling the speed of the drive motor of the mounting conveying device (23).

24 Claims, 6 Drawing Sheets

(56) References Cited

U.S. PATENT DOCUMENTS

| | | | |
|---|---|---|---|
| 5,375,827 A * | 12/1994 | Lentz et al. | 271/270 |
| 5,462,400 A | 10/1995 | Bonnet | |
| 6,328,154 B1 * | 12/2001 | Huber | 198/782 |
| 2002/0005334 A1 * | 1/2002 | Matsumoto et al. | 198/678.1 |
| 2004/0173440 A1 * | 9/2004 | Mauch et al. | 198/781.05 |
| 2005/0029169 A1 | 2/2005 | Ricci et al. | |
| 2009/0028687 A1 * | 1/2009 | van de Klundert | 414/796.3 |
| 2010/0162694 A1 * | 7/2010 | Angleitner | 60/327 |

FOREIGN PATENT DOCUMENTS

| | | | | |
|---|---|---|---|---|
| DE | 692 18 620 | | 7/1997 | |
| EP | 0 321 680 | | 6/1989 | |
| EP | 0 462 518 | | 12/1991 | |
| GB | 1 559 973 | | 1/1980 | |
| JP | 06234426 A | * | 8/1994 | B65G 59/02 |
| JP | 07089616 A | * | 4/1995 | B65G 59/02 |
| JP | 08012084 A | * | 1/1996 | B65G 59/02 |
| WO | WO 93/10028 | | 5/1993 | |
| WO | WO 2006/088354 | | 8/2006 | |

* cited by examiner

DEPALLETING UNLOADING CONVEYOR

CROSS REFERENCE TO RELATED APPLICATIONS

This application is the National Stage of PCT/AT2008/000252 filed on Jul. 10, 2008, which claims priority under 35 U.S.C. §119 of Austrian Application No. A 1155/2007 filed on Jul. 20, 2007. The international application under PCT article 21(2) was not published in English.

The invention relates to a depalleting device and a method for operating such a device.

From EP 0 462 518 B1 a method and a device are known for picking up and putting down packet-like products. A horizontally running mounting table has on its upper side a transport device for the product to be picked up or placed down. At the opposite end of the table driven roller or reversing roller-like mounting elements are provided, which when placed against vertical surfaces of the product to be mounted by means of the frictional force of the rotating mounting elements lift the product, and the latter is moved down by the transport device and thus mounted thereby. A first drive is provided for driving the mounting table and a second drive is provided for the mounting element or the transport device. A drive control depending on the control signals of proximity sensors controls the driving speed of the mounting table, whereby during the approach and placing of the mounting element up to the product at a uniform speed of the mounting element the driving speed of the mounting table is lower than after lifting the product and picking it up onto the mounting table.

From WO 2006/088354 A1 a depalleting device is known with a lifting device with a height-adjustable mounting table driven linearly by means of a feed drive. The latter mounting table is provided with a roller or belt conveyor and a mounting roller placed in front of the roller or belt conveyor with a common drive. By applying a frictional force onto a vertical face of a transported product to be picked off a stack by means of the mounting roller the transported product is lifted and then moved onto the roller or belt conveyor. Detecting means are arranged in front of the mounting roller and on both sides of the product on a support arm of the mounting roller, said detecting means being formed by a light beam transmitter and a light beam receiver. By means of the signals of this device depending on the approach of the transport roller to the product on establishing the approach to the transported product, by interruption of the light beam, the advancing speed is increased by increasing the speed of the advancing drive of the mounting table to achieve increase frictional force starting from a lower base speed. As soon as the lifted state is detected by the light beam the speed is reduced and thereby the advancing speed. The increase in the advancing speed also increases the pressure loading on the conveyed product to be mounted with the risk of damage.

From DE 26 31 942 A1 a further depalleting device is known with a horizontally adjustable conveyor belt provided with a drive, which conveyor belt at one end comprises a guiding roller with a small diameter for the belt-like conveying means. The guiding roller is supported elastically by a spring arrangement relative to the support frame of the conveyor belt and guided adjustably parallel to a driving direction of the mounting table. During the progressive movement of the mounting table and placing the guiding roller on a vertical face of the product during the spring-loading according to the spring characteristic increased pressure is exerted onto the product which leads to increasing frictional force for the lifting process.

The objective of the invention is to create a depalleting device by means of which short cycle times for the depalleting process are achieved and a high degree of automation is achieved by adjusting the depalleting device to specific properties of the transported product.

This objective is achieved by the features according to the invention. The surprising advantage in this case is that a functionally and technically high quality depalleting device is created, in which a further application area is obtained for transported products of different types to be provided in a storage system by means of an evaluation integrated into the process of the force acting on the transported product and said force can be specified as a process variable according to the transported product to be depalleted for controlling the mounting conveying device.

An embodiment is also possible by means of which a simple mechanical structure is achieved with high functionality and by means of a modular structure existing systems can be retrofitted in an inexpensive manner.

Another embodiment is also advantageous, by means of which a further technically simple and functional variant is achieved for controlling a mounting conveying device with simple adjustment to the product.

Further advantageous embodiments are described by means of which a low-maintenance and long-lasting functional safety is ensured.

Other advantageous embodiments according to the invention enable a design of the depalleting device which corresponds to individual requirements.

However, another embodiment according to the invention is also advantageous by means of which the drive motor is controlled on the basis of a driving torque of the conveying roller of the mounting conveying device as load parameter.

By means of another advantageous embodiment a depalleting device is obtained that can be set up for a storage management organization for the arrangement of various different goods.

According to other advantageous embodiments a sensitive depalleting device is achieved optionally with different components.

Also other advantageous embodiments are desribed by means of which the lifting procedure of a transported product to be depalleted is performed by the option of minimizing the required lifting procedure and also the maintenance of the depalleting device and possible replacement of components particularly subject to wear is simplified.

Further advantageous embodiments ensure a simple mechanical and thus also inexpensive structure of the depalleting device.

Lastly, also an embodiment is advantageous, by means of which a high degree of functionality and operational safety of the depalleting device is achieved by minimizing the components.

The invention also relates to a method for operating the depalleting device to solve the said problem.

The method is characterized by the measures according to the invention. The surprising advantage here is a high degree of automation for adjusting the depalleting process to the nature of the transported product, whereby the operating safety is increased and short cycle times are achieved as well as minimizing the manipulation costs.

Lastly, further advantageous measures are described, by means of which optimized measures increasing the depalleting performance are achieved by means of a control adjustment to the transported product.

For a better understanding of the invention the latter is explained in more detail with reference to the exemplary embodiments shown in the Figures.

Figure 1:
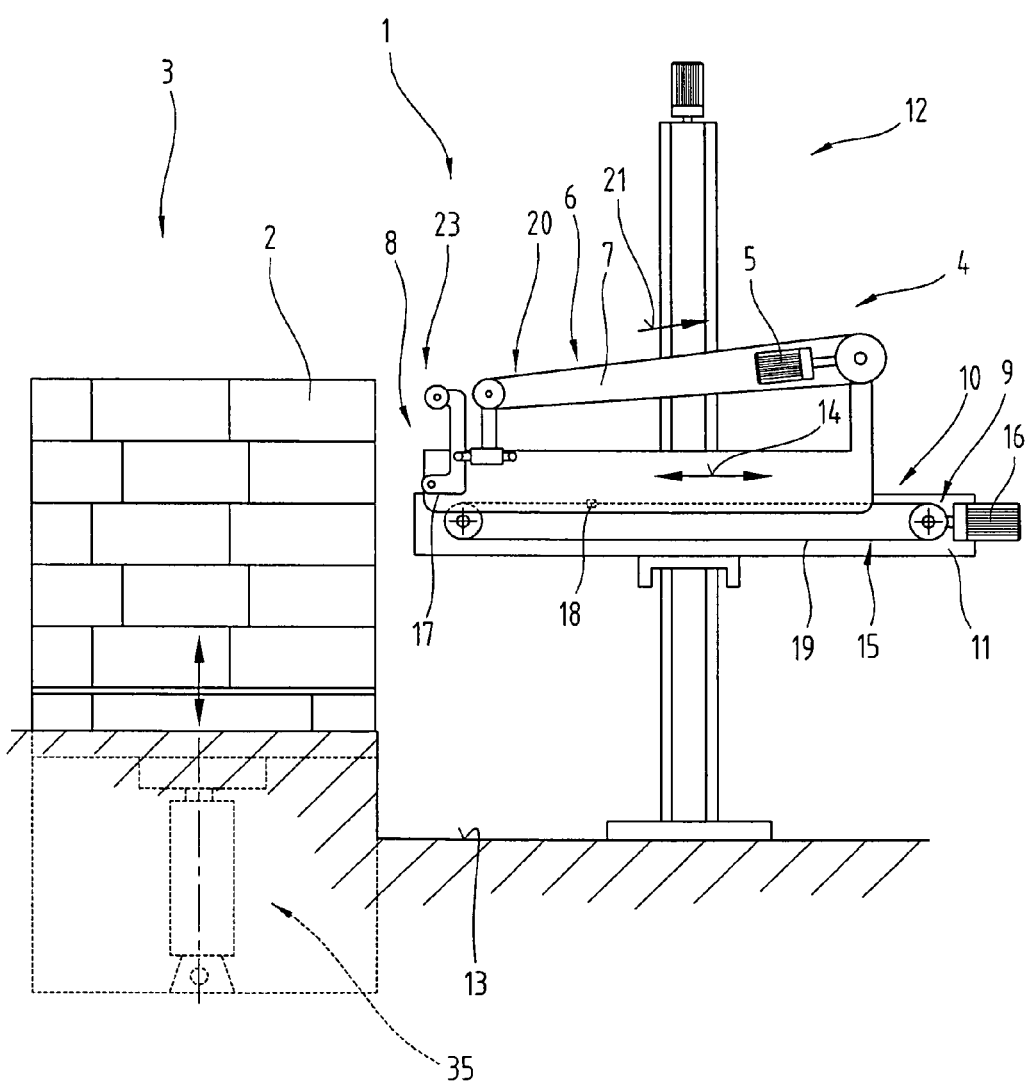
FIG. 1 shows the depalleting device according to the invention in elevation.

First of all, it should be noted that in the variously described exemplary embodiments the same parts have been given the same reference numerals and the same component names, whereby the disclosures made throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

Figure 2:
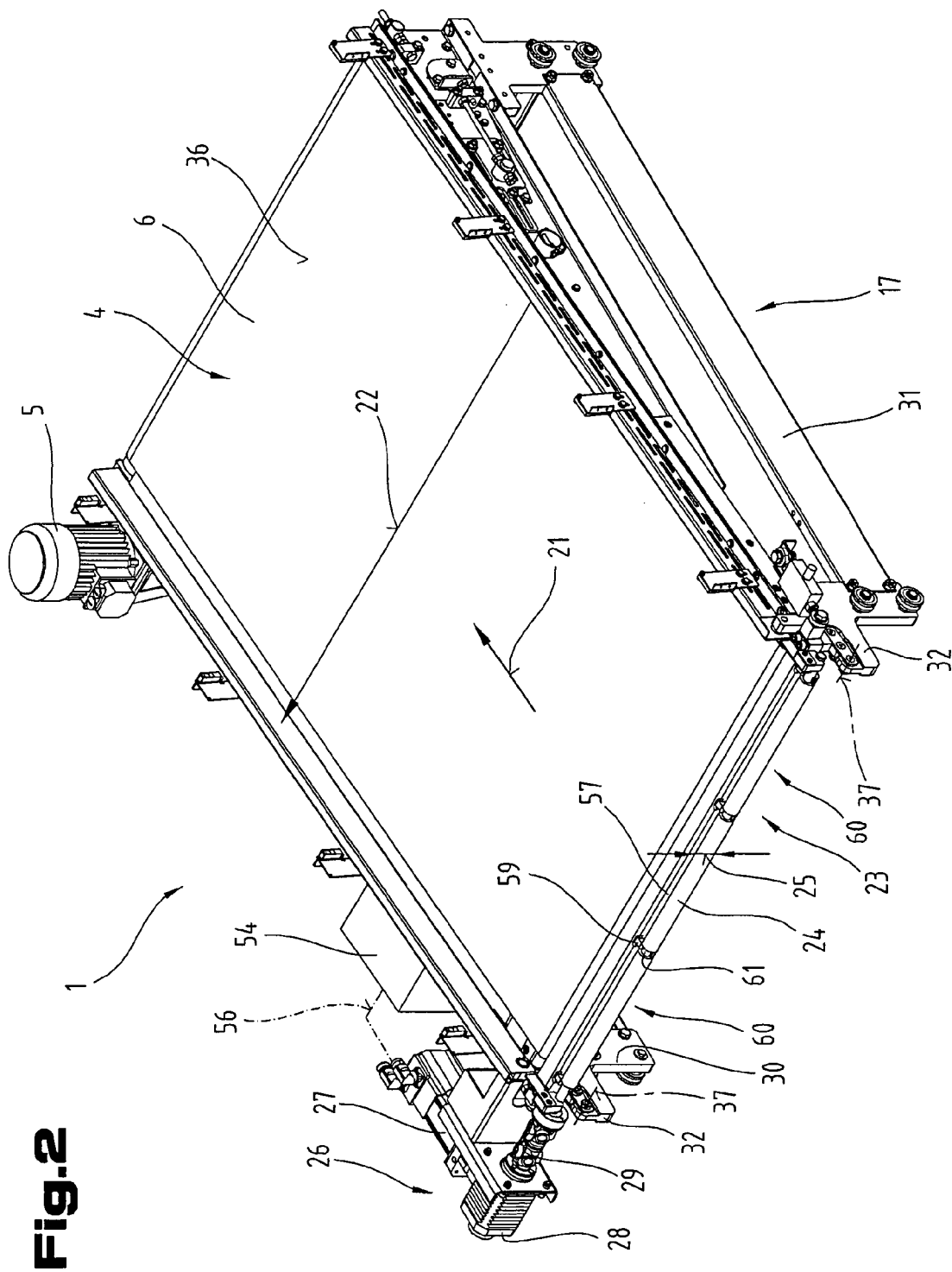
FIG. 2 shows a detailed view of the depalleting device according to FIG. 1 in schematic view.
Figure 3:
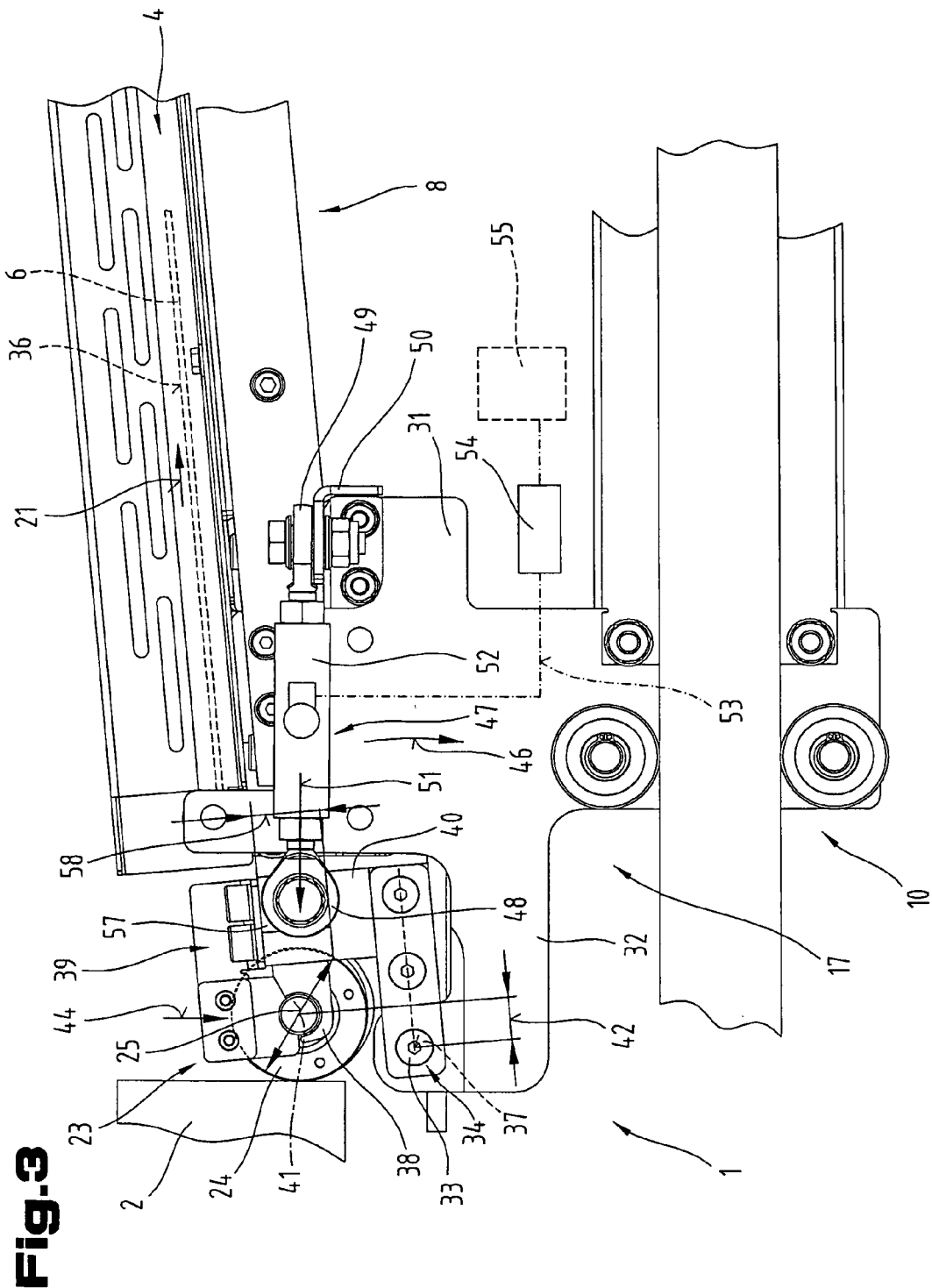
FIG. 3 shows a further detailed view of the depalleting device in elevation.

In FIGS. 1 to 3 a depalleting device 1 is shown for picking up a transported product 2, e.g. from transport containers, storage containers, packets, from a prepared stack 3 of the transported product 2. A mounting table 8 provided with a conveying device 4 with conveying means 6 operated by a drive motor 5, e.g. band 7, belt, chain, rollers, is adjustable linearly by means of a feed drive 9 in a guiding arrangement 10, which runs for example in support arms 11 of a lifting device 12 parallel to a standing surface 13—according to double arrow 14. The feed device 9 is formed e.g. by a flexible drive 15 and a drive motor 16, whereby a support frame 17 of the mounting table 8 is drive-connected by a driver 18 to a pulling means 19, e.g. chain, belt etc.

In at least one end section 20 of the support frame 17 of the mounting table 8 and opposite a conveying direction—according to arrow 21—of the conveying device 4 and arranged in front of the latter is a mounting conveying device 23 extending over the entire transport width 22 formed by a conveying roller 24 with a relatively small diameter 25.

A drive device 26 for the conveying roller 24, which is independent of the feed drive 9 and the drive of the conveying means 6 of the conveying device 4, forms a speed-controllable drive motor 27 e.g. servomotor, hydraulic motor etc. arranged laterally on the support frame 17. For drive-technical and structural reasons preferably a right angle gear 28 is provided and a drive connection is formed between the drive unit and conveying roller 24 mounted to be rotatable and slightly adjustable in position, as described later in more detail, by means of a Cardan shaft 29, whereby small mass forces act on the conveying roller 24.

As represented in FIG. 1 by broken lines, it is of course also possible to put down the transported product 2 to be depalleted on a lifting device 35 designed as a lifting platform, in order to adjust the height according to the positions of the transported product 2 to be depalleted with regard to the transport plane 36 defined by the depalleting device 1 with the mount conveying device 23 and the conveying device 4. This enables a fixed height structure of the depalleting device 1 and further guiding conveying means in a storage position and thus provides a further essential design option for storage and goods picking system.

As can be taken in particular from FIGS. 2 and 3, an open space is provided between side profiles 30, 31 of the support frame 17 which extend in advancing direction—according to double arrow 14—that is slightly greater than the transport width 22 limited by the conveying means 6 or by lateral guiding profiles. The side profiles 30, 31 comprise in direction against the transport direction—according to arrow 21—support extensions 32 with pivot bearing 33 of a pivot bearing arrangement 34 projecting over the support frame 17.

Said pivot bearing arrangement 34 forms a pivot axis 37 running parallel to transport plane 36 of the conveying means 6 and perpendicular to the conveying direction—according to 21, for a pivot lever arrangement 39 rotatably mounting the conveying roller 24 in rotary bearings 38. The latter is formed essentially by two support brackets 40 which are mounted by an arm in the pivot bearing 33 and in a further arm comprise the rotary bearings 38 for the conveying roller 24. A thus formed rotary axis 41, about which the conveying roller 24 can be rotated, runs parallel to the pivot axis 37.

The rotary axis 41 is offset relative to the pivot axis 37 in transport direction—according to arrow 21—by distance 42 and is set slightly deeper than the transport plane 36.

As soon as the conveying roller 24 as a result of the advancing movement of the mounting table 8 reaches a side face of the transported product 2, forces are produced—according to arrow 44—which lead to a pivot movement—according to arrow 46—of the pivot lever arrangement 39 in the direction of the conveying device 4.

Acting against this pivot movement between the pivot lever arrangement 39, in particular the support brackets 40 and the support frame 17 or the side profiles 33, 31, preferably one support device 47 is provided respectively, which is arranged by means of articulation means 48, 49 on the one hand on the support bracket 40 and on the other hand one on an anchor profile 50 of the side profiles 30, 31.

The support device 47 acts with a support force forming a load parameter—according to arrow 51—of a pivot movement against a torque caused by the forces—according to arrow 44—on the pivot lever arrangement 39.

The support device 47 is designed to detect the variably opposing support force—according to arrow 51—from the forces acting—according to arrow 44—via the conveying roller 24 onto the lever arrangement, whereby the latter is provided with a detecting means 52 or is designed for detection itself. The detected size of the support force—according to arrow 51—is directed via generated signals via a communication connection 53, e.g. cable or a wireless signal transmission to a control and regulating device 54, is communication-linked if necessary to a central control device 55.

According to control algorithms or control data stored in the control and regulating device 54 or central control device 55 the speed of the drive motor 27 of the drive device 26 can be controlled for the conveying roller 24 between a base speed and a speed increased in relation thereto. The drive motor 27 is connected with the control and regulating device 54 by means of a cable 56.

The base speed of the conveying roller 24 is preferably set to a circumferential speed, which corresponds to an almost uniform conveying speed of the conveying means 6 of the conveying device 4. The control of the speed increase of the conveying roller 24 is performed as a function of the increase in the detected support force—according to arrow 51.

As also shown in FIGS. 2 and 3, the pivot lever arrangement 39 with the support brackets 40 is completed by a transverse strut 57 connecting the latter in the direction of the transport width 22, which strut extends between the conveying roller 24 and a guiding roller of the conveying means 6. The height 58 of the transverse strut 57 is less than the diameter 25 of the conveying roller 24, whereby no interfering contour is formed. On said transverse strut 57 preferably support bearings 59 are arranged protruding in the direction of the conveying roller 24.

Also a conveying roller 24 with a continual axis is possible, but according to a further embodiment, as shown, it is also possible to divide the conveying roller 24 into several roller sections 60. For example, it is also possible to connect the roller sections 60 with axial bolts 61 transmitting over speed and spaced a small distance apart from one another. This makes it possible to arrange the support bearings 59 at this distance, which can be designed as shell bearings undergripping the axial bolts 61 in sections.

In this way it is possible to design the conveying roller 24 to have a relatively large transport width 22 with a small diameter 25, whereby the mounting process for mounting the transported product 2 is facilitated and also the conveying roller 24 exposed to high frictional wear can be exchanged with little effort.

A design of the axial bolts 61 is also possible with face end coupling projections, which are designed on the one hand for transmitting the torque and on the other hand for an axially flush alignment.

In the exemplary embodiments shown the conveying device 4 is supported relative to the support frame 17 by an angle of inclination increasing to the mounting table 8. However, this is not a requirement for the depalleting device 1 and it is of course also possible to align the transport plane horizontally, i.e. parallel to the standing surface 13.

For the support device 47 and the detecting means 52 a series of technical options are possible. One of these is for example the use of a pressure measuring box. Also an accumulator under medium pressure is possible with a pressure measuring sensor.

A further option is the use of a piezo sensor as detecting means 52 which is loaded for example by a pretensioned helical compression spring with changing spring force and in this way the support force is determined as a load parameter.

Figure 4:
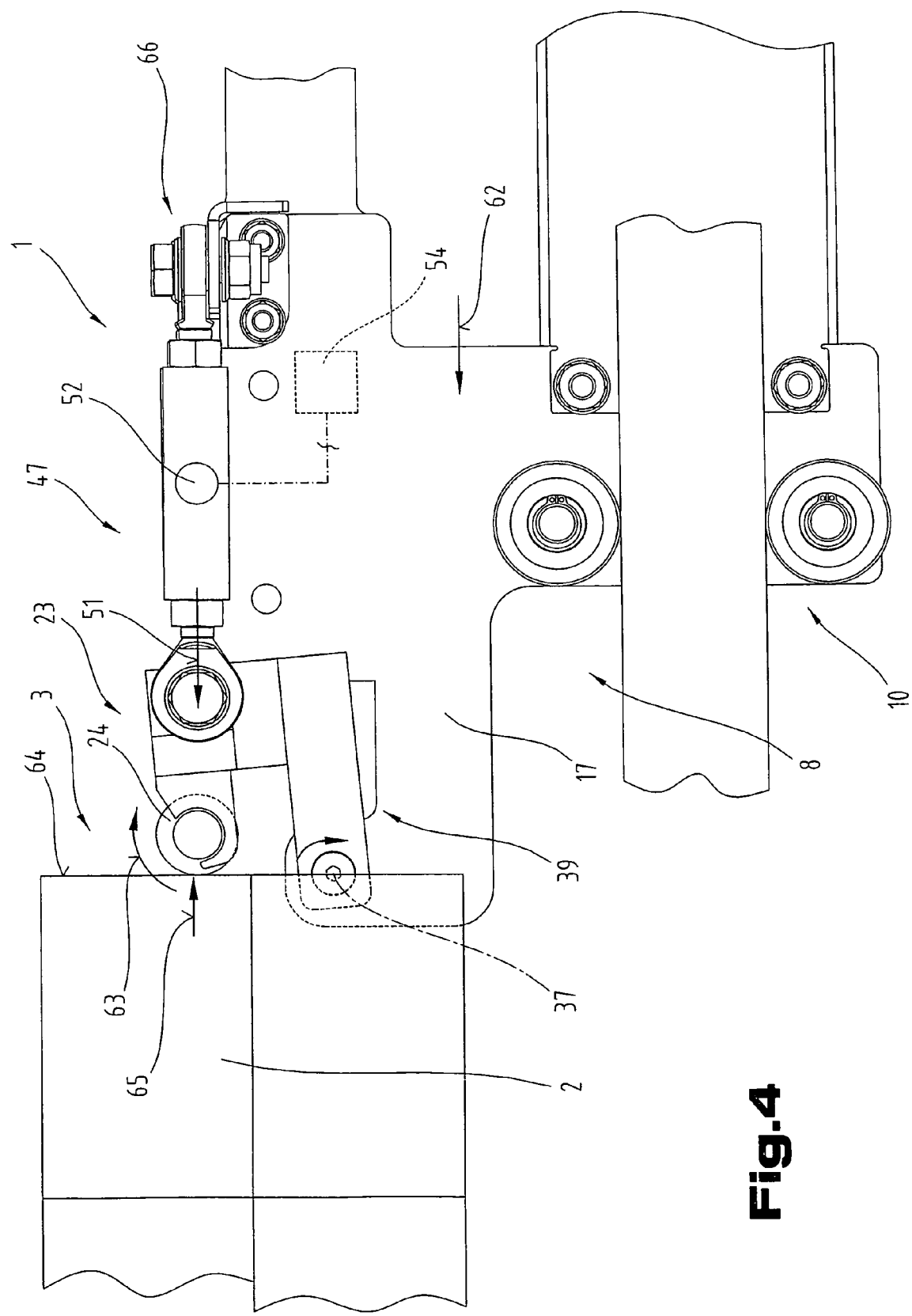
FIG. 4 shows detailed view of a support device of the depalleting device on placing the mounting conveying device up to the transported product, in elevation.
Figure 5:
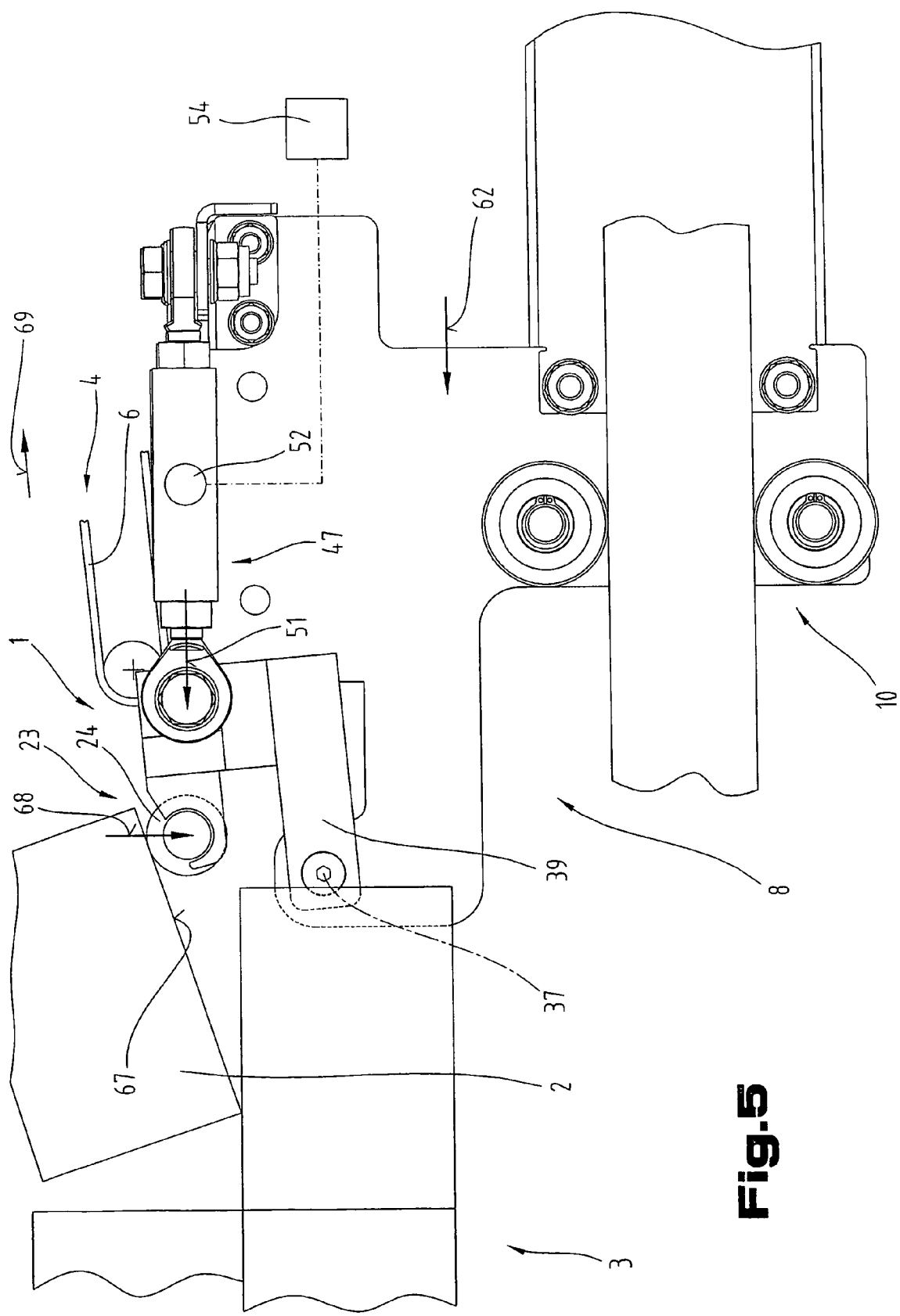
FIG. 5 shows a further detailed view of the depalleting device with a raised transport product, in elevation.

FIGS. 4 and 5 show a simplified view of the mounting of the transported product 2 from a stack by the depalleting device 1, in particular the lifting and under-driving of the transported product 2 or a series of transported products from the stack 3 by the mounting conveying device 23.

For mounting the transported product 2 the mounting table 8 is moved by means of the not shown feed device and given advancing speed in the direction of the stack 3—according to arrow 62—in the guiding arrangement 10. A speed of the conveying roller 24 in a rotary direction—according to arrow 63, which on pressing the conveying roller 24 against end faces 64 of the transported product 2 causes lifting by means of frictional force, is already set in the previously defined base value. As soon as the conveying roller 24 reaches the end face 64 a force—according to arrow 65—is exerted onto the latter, which leads to a torque on the pivot lever arrangement 39 and initiates a pivot movement about the pivot axis 37.

The support device 47 arranged between the pivot lever arrangement 39 and a thrust bearing 66 on the mounting table 8 opposes this torque—the support force—according to arrow 51.

The advancing speed of the mounting table 8 causes an increase in the support force—according to arrow 51, which is established by detecting means 52 as load parameters and as control parameter enters the drive of the drive device 26 of the conveying roller 24.

By means of a control characteristic or data pattern stored in the control and regulating device 54 the speed of the conveying roller 24 is increased with increasing support force—according to arrow 51.

The transported product 2 is tilted up to a height for driving underneath during a progressive feed movement by the conveying roller, as can be taken from FIG. 5.

As soon as the transported product 2 comes to bear with a lower side 67 on the conveying roller 24, the frictional force of the conveying roller 24 on the transported product 2 causes a counter torque on the lever arrangement 39 and although a weight-dependent bearing force—according to arrow 68—acts on the conveying roller 24 because of the counter torque a momentary drop in the size of the support force is caused, which usually because of the geometric conditions of the lever arrangement 39 is a compression force, however even under the aforementioned ratio of torques can change into a tensile force.

According to the predetermined control characteristics of the load parameter on establishing this change in the support force the speed of the conveying roller 24 is reduced to a circumferential speed, which corresponds to the transport speed—according to arrow 69—of the conveying device 4 for transporting the transported product 2 onto the conveying means 6 and represents a base speed.

It is also the case that the advancing speed of the mounting table 8 in the direction of the stack—according to arrow 62—corresponds approximately to the advancing speed—according to arrow 69—of the conveying device 4. The advancing movement in the direction of the stack 3 is continued on picking up the transported product 2 until the transported product 2 is completely mounted on the conveying roller 24 by the conveying means 6 of the conveying device 4.

With regard to the control characteristics stored in the control and regulating device 54 it should be noted that depending on the respective transported product, defined load parameters can be stored and thereby depalleting processes can be adapted to properties such as weight, sensitivity to damage etc. of the transported product 2, and said parameters can be determined as control settings before starting the depalleting process, e.g. in operation scheduling.

Figure 6:
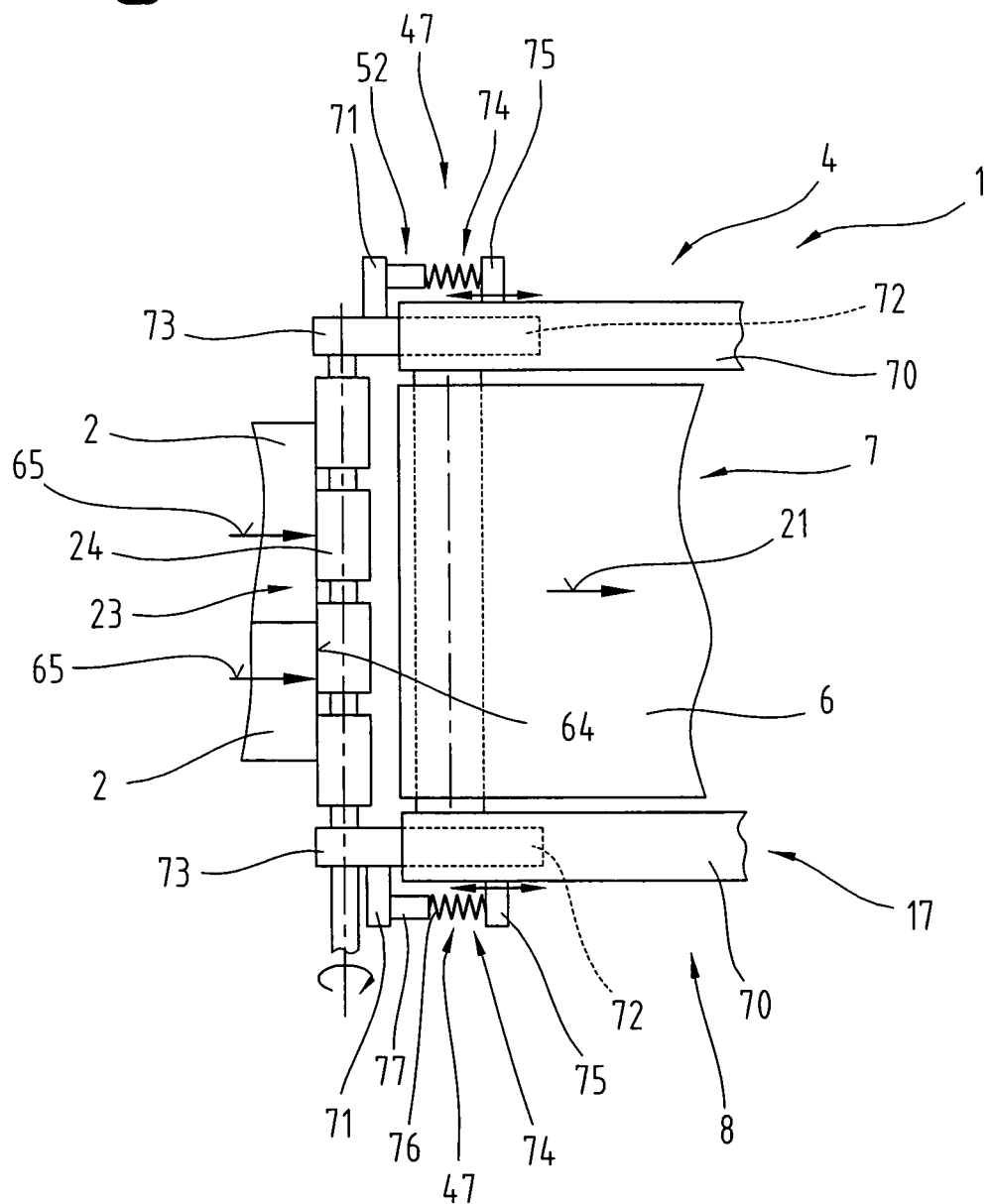
FIG. 6 shows another embodiment of the depalleting device with the mount conveying device, in a simplified view.

FIG. 6 shows a further embodiment of the depalleting device 1 in simplified view in the region of the mounting conveying device 23.

Frame profiles 70 of the mounting table 8 with the conveying device 4 project laterally according to the exemplary embodiment shown over the conveying means 6, e.g. belt 7, of the conveying device 4. On the latter in end sections 71 or on facing sides linear guides 72 are provided and in the latter linearly adjustable guiding elements 73 are arranged which rotatably mount the conveying roller 24.

Said guiding elements 73 are adjustable for example against the action of a spring arrangement 74, as soon as a force—according to arrow 65—is exerted by the transported product 2 on placing the conveying roller 24 on its side face 64, in linear direction in transport direction—according to arrow 21—relative to the conveying means 6 of the conveying device 4.

An adjustable support device 47 acts against this adjustment, which support device is arranged between the guiding elements 73 and the frame profiles 70, is designed to be elastic and comprises detecting means 52.

In this case a design of the support device 47 is possible with a compression spring 76 which can be adjusted in its pretensioning by a control element 75, which acts on a switching means 77 as detecting means 52 for determining the order of magnitude of the support force forming the load parameter as a control signal for controlling the speed of the mounting conveying device 23. The switching means 77 is an on-off switch or proximity sensor for example.

This embodiment makes it possible, as already described in the preceding exemplary embodiments, depending on the reaction force determined by the load parameters such as driving torque or support force and acting on the transported product 2, to control the speed as a function of a predetermined control characteristic stored in the control and regulating device 54 or in a data memory, of a control file etc., to run the conveying roller 24 at a variable speed adapted by at least one physical parameter of the transported product 2.

For example, the conveying roller 24 is driven at a base speed and in such a way as to increase the latter as required as a function of the detected load parameter according to the control characteristic and according to the transported product 2, and as soon as the support force falls is reduced back to the base speed. This switching procedure is performed as soon as the transported product 2 is lowered after lifting from the conveying roller 24 or placed on the latter.

Preferably, at the base speed, the circumferential speed of the conveying roller 24 is equal to the transport speed of the conveying means 6 of the conveying device 4.

These means of operating the depalleting device 1 relate both to the embodiments according to the previously described FIGS. 1 to 5 as well as the further design of the depalleting device 1 described in FIG. 6.

An additional way of controlling the speed of the drive motor 27 of the mounting conveying device 23 is to determine the driving torque of the drive motor 27 as a load parameter by means of a measuring device, e.g. measuring the energy pick up: in the case of an electric motor e.g. by means of the current take up or in a hydraulic motor by measuring the pressure medium.

As soon as the conveying roller 24 bears against the transported product 2 the load parameter increases and according to a control characteristic or control file stored in the control and regulating device 54 there is an increase in the speed until a drop in the load parameter is detected and the speed is set back to the base value.

The exemplary embodiments show possible embodiment variants of the depalleting device, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the depalleting device, the latter and its components have not been represented true to scale in part and/or have been enlarged and/or reduced in size.

List of Reference Numerals

1 Depalleting device
2 Transported product
3 Stack
4 Conveying device
5 Drive motor
6 Conveying means
7 Belt List of Reference Numerals -continued 8 Mounting table
9 Feed drive
10 Guiding arrangement
11 Support arm
12 Lifting device
13 Contact surface
14 Double arrow
15 Flexible drive
16 Drive Motor
17 Support frame
18 Driver
19 Pulling means
20 End section
21 Arrow
22 Transport width
23 Mouting conveying device
24 Conveying roller
25 Diameter
26 Drive device
27 Drive motor
28 Right-angle gear
29 Cardan shaft
30 Side profile
31 Side profile
32 Support extension
33 Pivot bearing
34 Pivot bearing arrangment
35 Lifting device
36 Transport plane
37 Pivot axis
38 Rotary bearing
39 Pivot lever arrangement
40 Support bracket
41 Rotary axis
42 Distance
44 Arrow
46 Arrow
47 Support device
48 Articulation means
49 Articulation means
50 Anchor profile
51 Arrow
52 Detecting means
53 Communication connection
54 Control and regulating device
55 Central control device
56 Cable
57 Transverse strut
58 Height
59 Support bearing
60 Roller section
61 Axial bolt
62 Arrow
63 Arrow
64 End face
65 Arrow
66 Thrust bearing
67 Lower side
68 Arrow
69 Arrow
70 Frame profile
71 End section
72 Linear guide
73 Guide element
74 Spring arrangment
75 Control element
76 Compression spring
77 Switching means

The invention claimed is:

1. Depalleting device (1) for unloading products (2) provided in a stack (3) comprising
i) a mounting table (8), the mounting table being adjustable linearly in a guiding arrangement (10) via a feed drive (9) having a first drive motor (16), and the mounting table having a support frame (17), ii) a conveying device (4) arranged on the mounting table (8) and connected to a second drive motor (5),
iii) a receiving conveying device (23) arranged at least at one of the front ends of the conveying device (4),
the receiving conveying device (23) being mounted adjustably on the support frame (17) relative to the conveying device (4) and against the action of at least one support device (47) and having a conveying roller (24) for lifting at least one product (2) in the stack (3), the conveying roller (24) being connected to a third drive motor (27), and the third drive motor (27) being of the type of an electric speed-controlled motor,
iv) a detecting means (52) for detecting either a support force (51) applied on the conveying roller (24) upon contact with the at least one product (2) to be depalleted or a driving torque of the third drive motor (27), the detecting means (52) being connected to a control (54) and
v) the control (54) being connected to the third drive motor (27) and for controlling a driving speed of the third drive motor (27) for the conveying roller (24) either on the basis of the support force applied on the conveying roller (24) upon contact with the at least one product (2) to be depalleted or on the basis of the driving torque of the third drive motor (27).

2. Depalleting device (1) according to claim 1, wherein the receiving conveying device (23) is mounted rotatably in a pivot lever arrangement (39), which is mounted pivotably in pivot bearings (34) on the support frame (17) of the mounting table (8) about a pivot axis (37) running perpendicular to a transport direction and parallel to a transport plane (36) of the conveying device (4) and wherein the at least one support device (47) is arranged between the pivot lever arrangement (39) and the support frame (17), the at least one support device (47) being provided with the detecting means (52) for detecting the support force (51) applied on the conveying roller (24) upon contact with the at least one product (2) to be depalleted.

3. Depalleting device (1) according to claim 2, wherein the support device (47) is secured via a first articulation means (48) onto the pivot lever arrangement (39) and via a second articulation means (49) onto the support frame (17).

4. Depalleting device (1) according to claim 3, wherein the first and second articulation means (48, 49) form a tension-free joint connection.

5. Depalleting device (1) according to claim 2, wherein the conveying roller (24) is mounted rotatably in rotary bearings (38) of the pivot lever arrangement (39).

6. Depalleting device (1) according to claim 2, wherein the pivot lever arrangement (39) comprises a first support bracket (40) and a second support bracket (40), the first and second support brackets (40) are spaced apart from each other in a direction of the pivot axis (37) and mounted pivotably on the support frame (17) and projecting over the support frame (17), and the conveying roller (24) is mounted rotatably between the first and second support brackets (40) and the spacing between the support brackets (40) is greater than the transport width (22) of the conveying device (4).

7. Depalleting device (1) according to claim 6, wherein the at least one support device comprises first and second support devices and the detecting means comprises first and second detecting means, wherein the first support bracket (40) is supported by the first support device (47) provided with the first detecting means (52) and the second support bracket (40) is supported by the second support device (47) provided with the second detecting means (52), and wherein the first and second support brackets (40) each is supported via the first and second support devices (47) on the support frame (17), whereby a line of action of the support force runs approximately parallel to the transport plane (36) and within a normal distance between the transport plane (36) and the pivot axis (37).

8. Depalleting device (1) according to claim 1, wherein the support frame (17) comprises linear guides (72) and the receiving conveying device (23) is mounted adjustably in a transport direction by the linear guides (72) against the action of at least one support device (47), the at least one support device being provided with the detecting means (52) for detecting the support force (51) applied on the conveying roller (24) upon contact with the at least one product (2) to be depalleted.

9. Depalleting device (1) according to claim 8, wherein the conveying roller (24) is mounted rotatably between a first guiding element (73) and a second guiding element (73), the first and second guiding elements (73) being arranged adjustably in the linear guides (72) and are supported via a first support device (47) and a second support device (47), and wherein the first support device (47) is provided with a first detecting means (52) and is preloaded via a first spring, and wherein the second support device (47) is provided with a second detecting means (52) and is preloaded via a second spring.

10. Depalleting device (1) according to claim 1, wherein the third drive motor (27) of the receiving conveying device (23) is arranged on the support frame (17).

11. Depalleting device (1) according to claim 1, wherein the detecting means (52) of the support device (47) is formed by a force measuring sensor.

12. Depalleting device (1) according to claim 1, wherein the detecting means (52) is in the form of a piezo element.

13. Depalleting device (1) according to claim 1, wherein the support device (47) is formed by a pressure storage element that can be charged by a pressure medium.

14. Depalleting device (1) according to claim 13, wherein the detecting means (52) is formed by a pressure measuring sensor provided on the pressure storage element.

15. Depalleting device (1) according to claim 1, wherein the support device (47) comprises a control element (75) for optionally adjusting the support force acting against the relative adjustment of the receiving conveying device (23).

16. Depalleting device (1) according to claim 15, wherein the control element (75) is formed by an adjusting means controlled by the spring tensioning of a spring arrangement (74) and a tensioning force of the support device (47) which adjusting means is effective in a line of action of the support force.

17. Depalleting device (1) according to claim 15, wherein the control element (75) is formed by a pressure regulator for a pressure medium.

18. Depalleting device (1) according to claim 1, wherein the conveying roller (24) extends over at least a transport width (22) of the conveying device (4).

19. Depalleting device (1) according to claim 1, wherein the conveying roller (24) comprises several roller sections (60) that are arranged spaced apart from one another and the several roller sections (60) are connected via torque-transmitting axial bolts (61).

20. Method for unloading products (2) provided in a stack (3) via a depalleting device (1), the depalleting device comprising
i) a mounting table (8), the mounting table being adjustable linearly in a guiding arrangement (10) via a feed drive (9) having first drive motor 16 and the mounting table having a support frame (17), ii) a conveying device (4) arranged on the mounting table (8) and connected to a second drive motor (5), iii) a receiving conveying device 23 arranged at least at one of the front ends of the conveying device (4), the receiving conveying device (23) being mounted adjustably on the support frame (17) against the action of at least one support device (47) and having a conveying roller (24) for lifting at least one product (2) in the stack (3) the conveying roller (24) being connected to a third drive motor (27), and the third drive motor (27) being of the type of an electric speed-controlled motor, iv) a detecting means (52) which is connected to a control (54) and v) the control is connected to the third drive motor (27), the method for unloading at least one product (2) comprising the steps of:

positioning the mounting table (8) relative to the stack (3) via the feed drive (9);

contacting and lifting the at least one product (2) via the conveying roller (24), thereby driving the conveying roller (24 via the third drive motor (27);

conveying the at least one product (2) onto the conveying device (4);

detecting either a support force (51) applied on the conveying roller (24) upon contact with the at least one product (2) to be depalleted or a driving torque of the third drive motor (27) via the detecting means (52);

controlling a driving speed of the third drive motor (27) for the conveying roller (24) via the control (54);

the driving speed of the third drive motor (27) for the conveying roller (24) being controlled thereby either on the basis of the support force applied on the conveying roller (24) upon contact with the at least one product (2) to be depalleted or on the basis of the driving torque of the third drive motor (27).

21. Method according to claim 20, wherein a circumferential speed of the conveying roller (24) at a base speed is essentially the same as an essentially constant conveying speed of the conveying device (4).

22. Method according to claim 20, wherein the driving speed of the third drive motor (27) and thereby a circumferential speed of the conveying roller (24) can be varied according to at least one physical parameter of the product (2).

23. Method according to claim 20, wherein the method further comprises the step of defining control characteristics for the support force or driving torque depending on the respective products (2), and wherein the driving speed for the third drive motor (27) is controlled as a function of a predetermined control characteristic.

24. Method according to claim 23, wherein the third drive motor (27) is operated on a base speed and wherein upon the detection of an increase in load of the support force or driving torque the speed is increased on the basis of the predetermined control characteristic and upon the detection of a drop in load of the support force or driving torque the speed is set back to the base speed.

* * * * *

UNITED STATES PATENT AND TRADEMARK OFFICE
CERTIFICATE OF CORRECTION

| | | |
|---|---|---|
| PATENT NO. | : 8,668,429 B2 | Page 1 of 1 |
| APPLICATION NO. | : 12/452722 | |
| DATED | : March 11, 2014 | |
| INVENTOR(S) | : Angleitner et al. | |

It is certified that error appears in the above-identified patent and that said Letters Patent is hereby corrected as shown below:

In the Claims

In particular, In Column 10, line 66 (line 6 of Claim 20) please change "first drive motor 16" to correctly read: -- a first drive motor (16), --.

In Column 11, line 3 (line 10 of Claim 20) please change "device 23" to correctly read: -- device (23) --.

Signed and Sealed this
Seventeenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,668,429 B2  Page 1 of 1
APPLICATION NO. : 12/452722
DATED : March 11, 2014
INVENTOR(S) : Karl Angleitner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1072 days.

Signed and Sealed this

Twenty-ninth Day of September, 2015

Michelle K. Lee
*Director of the United States Patent and Trademark Office*